United States Patent [19]
Henriot

[11] 3,766,796
[45] Oct. 23, 1973

[54] DEVICE FOR ROTATING A BODY BY MEANS OF AN EXTENSION PIECE

[75] Inventor: Georges Henriot, Gif-sur-Yvette, France

[73] Assignee: Engrenages Et Reducteurs, Velizy-Villacoublay, France

[22] Filed: Feb. 22, 1972

[21] Appl. No.: 227,927

[30] Foreign Application Priority Data
Feb. 26, 1971  France .............................. 7106789

[52] U.S. Cl. ............................................... 74/411
[51] Int. Cl. ............................................ F16h 57/00
[58] Field of Search .......................... 74/665 B, 411

[56] References Cited
UNITED STATES PATENTS

| | | | |
|---|---|---|---|
| 3,122,939 | 3/1964 | Durand ............................... | 74/411 |
| 2,560,990 | 7/1971 | Schmitter ........................... | 74/665 B |
| 3,090,258 | 5/1963 | Zink et al. ......................... | 74/411 X |
| 3,292,454 | 12/1966 | Konrad et al. ..................... | 74/411 X |
| 3,420,057 | 1/1969 | Barlow ............................... | 74/665 B X |

Primary Examiner—Leonard H. Gerin
Attorney—M. Julius Balogh

[57] ABSTRACT

This invention relates to a device for rotating a body, constituted by at least one speed reducing unit, the driven member of which is disposed substantially coaxially with the axis of rotation of the body, whilst said driven member is coupled by an extension piece, whose axis may have a slight angular clearance for making up the possible misalignment of the driven member and of the axis of rotation of the body, to a flange for rotating the body integral with said body, the driven member of the unit being disposed on the side opposite the body with respect to said unit and said driven member comprising a central traversing cavity, through which the extension piece extends, wherein the body being hollow and having an aperture substantially coaxial to its drive flange and the extension piece having, in manner known per se, a coaxial cavity, a first hollow shaft traverses the extension piece, is rendered integral with the body and is connected in sealed manner to the opening of said body.

3 Claims, 5 Drawing Figures

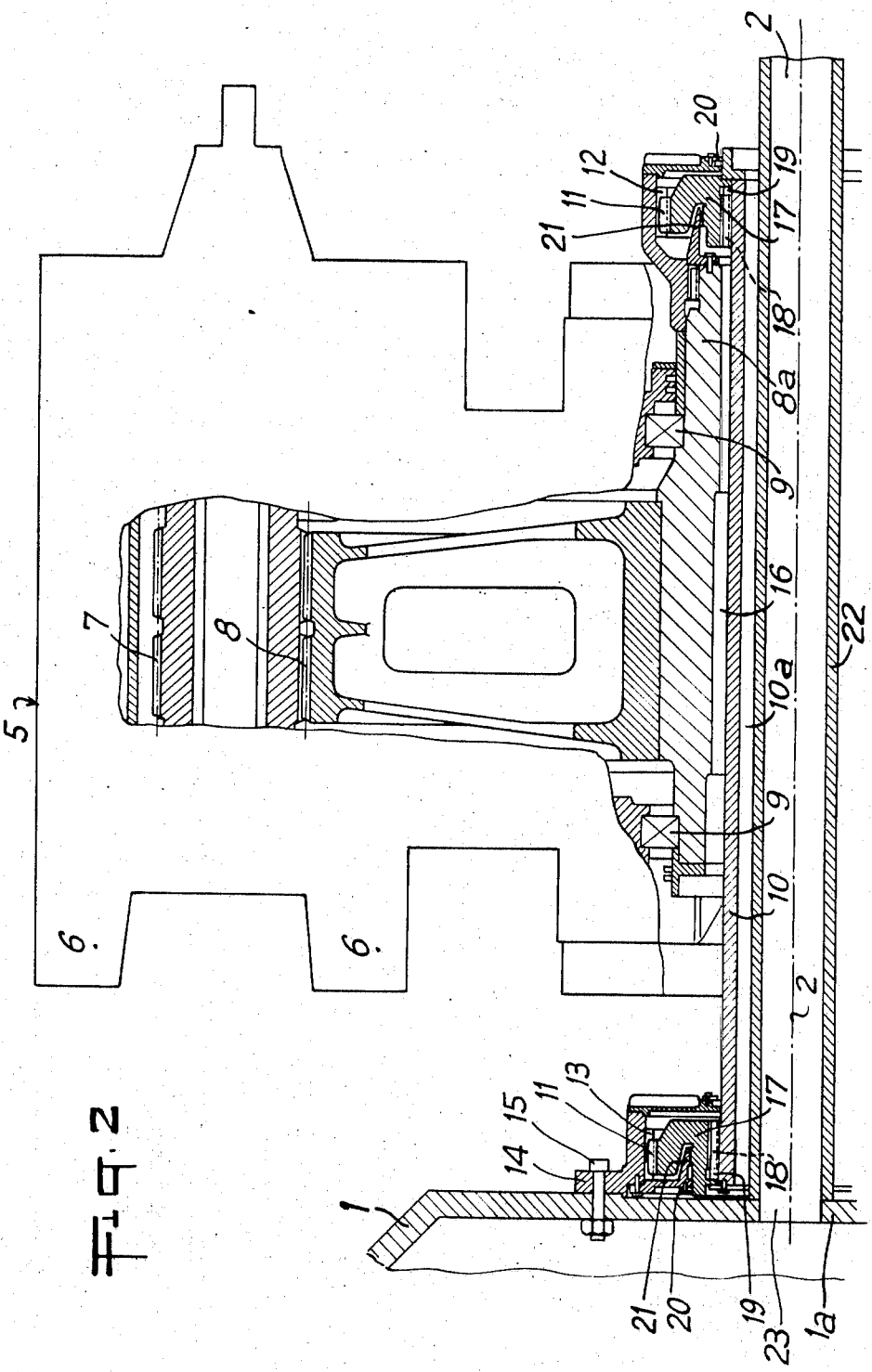

3,766,796

DEVICE FOR ROTATING A BODY BY MEANS OF AN EXTENSION PIECE

The present invention relates to a device for rotating a body by means of an extension piece.

It is known to rotate a body by coupling the driven shaft of a drive device to a flange integral with said body and coaxial to the axis of rotation of said body.

However, in large installations, the dimensions and weights of the body and drive device elements make it necessary to interpose a device for making up a possible misalignment of the driven shaft of the drive device with the flange integral with the body. The simplest of such recovering devices is constituted by an extension piece provided with grooves, toothed at its two ends.

In certain heretofore known installations, in order to reduce the total length of the device, the driven member of the unit is disposed on the side opposite the body with respect to said unit, whilst said driven member comprises a central traversing cavity through which the extension piece extends.

A few installations of this last type are relative to the rotation of a hollow body, which contains materials being treated. It is realised that in such installations, the introduction into or extraction from the hollow body of the material, or the introduction into the body of measuring equipment or tools, pose technical problems which have not yet been solved simply.

The applicants have studied this problem and after their research, have designed a new drive device, which forms the object of the present invention.

The invention therefore relates to a device for rotating a body, constituted by at least one speed reducer unit whose driven member is disposed substantially coaxially to the axis of rotation of the body. Said driven member is coupled, by an extension piece, whose axis may have a slight angular clearance for making up the possible misalignment of the driven member and the axis of rotation of the body, to a flange for rotating the body, integral with said body. It is disposed on the side opposite that of the body with respect to said unit and comprises a central traversing cavity, through which the extension piece extends.

The body being hollow and having an opening substantially coaxial to its drive flange and the extension piece having, in manner known per se, a coaxial cavity, a first hollow shaft passes through the extension piece, is rendered integral with the body and is connected in sealed manner to the opening of said body.

According to a first embodiment of the invention, a second shaft penetrates inside the body, through the first hollow shaft and, passing through the opening of said body, supports a measuring equipment by its part contained in said body.

According to a second variant embodiment, a second shaft penetrates inside the body through the first hollow shaft and, passing through the opening of said body, supports a tool, by its part contained in said body, whilst it is coupled by its end located on the unit side, where the driven member of this unit is disposed, to a drive motor unit.

The invention will be more readily understood upon reading the description of the accompanying drawings, in which:

FIG. 2 is a partial view, with part section through the axis of the extension piece, of a drive device similar to the one of FIG. 1;

Figure 1:
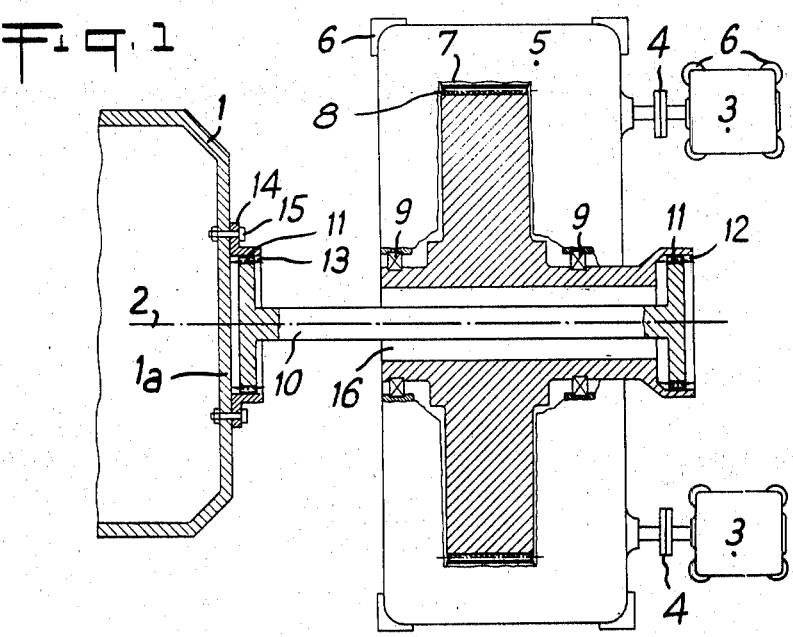
FIG. 1 is a schematic section through the axis of the extension piece of a drive device known per se.

Referring now to the drawings, FIG. 1 shows a body 1 mounted to rotate about an axis 2. The body 1 is provided with a drive device constituted by two speed reducing units, each of which comprises a motor 3 connected by a coupling 4 to a gear train 5. In the example shown, the motors 3 and gear trains 5 rest on the ground by support plates 6. The two gear trains 5 each comprise a pinion 7, the pinions 7 of the two trains meshing with the same gear ring 8 mounted to rotate with respect to the ground by rollers 9.

The gear ring 8 constitutes the single driven element of the two speed reducing units and is substantially coaxial with axis 2. This ring is coupled to the body 1 by an extension piece 10 which is provided at its ends with grooves 11, some of which cooperate with grooves 12 correspondingly disposed on the driven element of which they constitute the driven member, others with grooves 13 disposed on a flange 14 fixed to the body 1 by bolts 15.

It will firstly be noted that the grooves 12, integral with the gear ring 8, are disposed on the side opposite the body 1 with respect to the gear train 5. Concomitantly, a traversing cavity 16 has been made coaxial with the gear ring 8, this enabling the extension piece 10 to be disposed in this cavity 16. Furthermore, in the example shown, the body 1 is obturated, on the side of the drive device, by a wall 1a on which the flange 14 is fixed. Finally, the extension piece 10 is constituted by a solid shaft.

FIG. 2 shows an embodiment similar to the one of FIG. 1, except that the extension piece 10 is this time constituted by a hollow shaft provided with an axial cavity 10a. It may be noted that, for reasons of easy machining and assembly, the grooves 11 are in fact integral with support pieces 17 which are themselves rendered integral in rotation with the extension piece 10 by grooves 18, integral with pieces 17 and cooperating with grooves 19, integral with said extension piece 10. Axial stop rings 20 are screwed into the ends of the extension piece 10 opposite the support pieces 17, whilst, radially, said support pieces 17 are disposed opposite small cylindrical flanges 21 screwed to the flange 14 for one, and to the shaft 8a integral with the gear ring 8, for the other.

Figure 3:
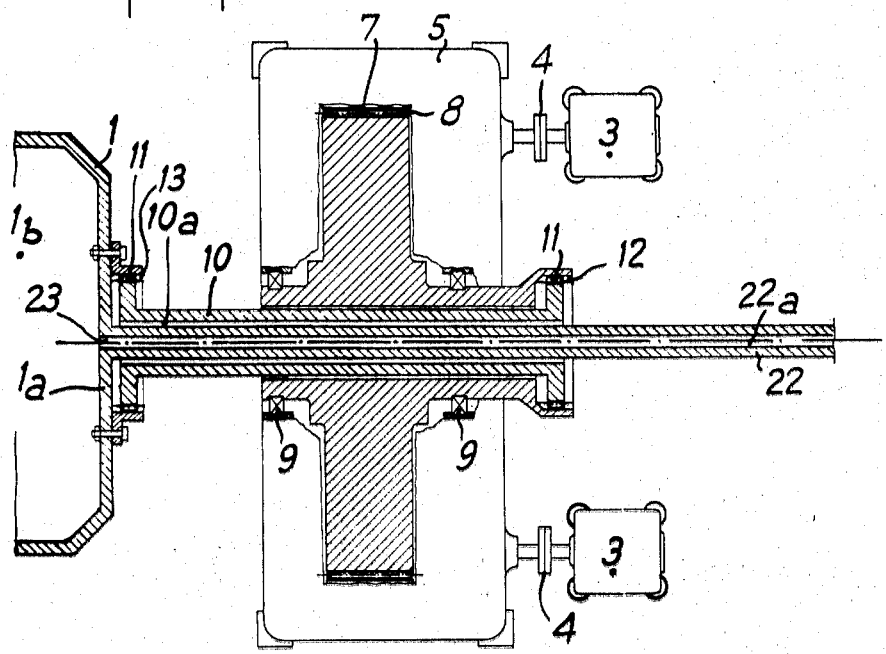
FIGS. 3, 4 and 5 are sections similar to that of FIG. 1, of first, second and third variant embodiments respectively of a drive device according to the invention.

FIG. 3 shows the elements already shown in FIG. 1; however, it will be noted that the extension piece 10 is provided with an axial cavity 10a, as has already been seen in FIG. 2. Furthermore, a first shaft 22 is integral in rotation with the body 1. The body 1 is hollow and the shaft 22, which itself comprises an axial cavity 22a, opens out through the wall 1a through an aperture 23 into the inner volume 1b of the body 1. The shaft 22 is disposed in the axial cavity 10a of the extension piece 10.

Figure 4:
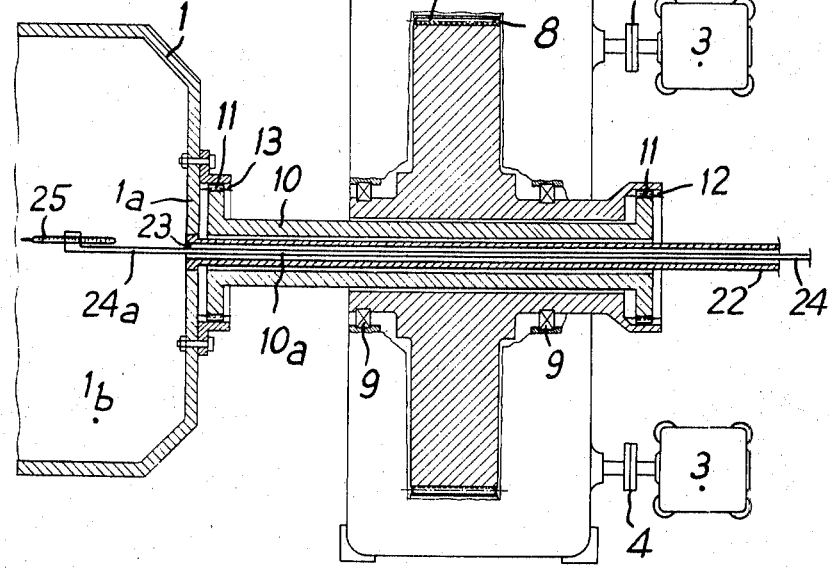

FIG. 4 shows the body 1 whose wall 1a is provided with an aperture 23. The extension piece 10 comprises the cavity 10a through which a second shaft, constituted by a support rod 24, has its end 24a introduced into the inner volume 1b of the body 1. A measuring instrument, such as a thermometer 25, is fixed to the end 24a.

Figure 5:
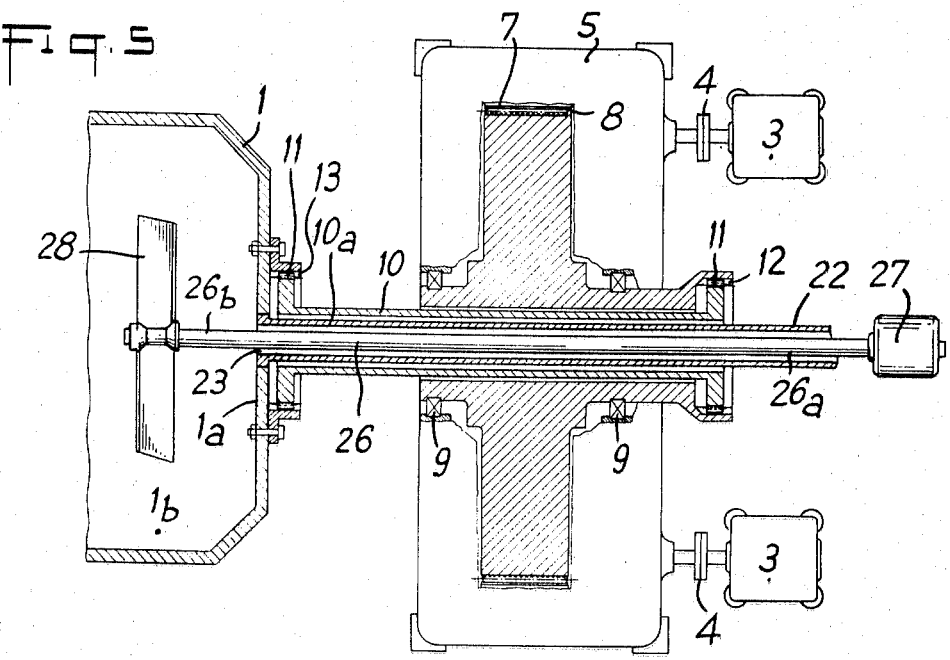

Finally, in FIG. 5, which is very similar to FIG. 4, the rod 24 has been replaced by a shaft 26, which is rotated by its end 26a, by a motor 27, and the second end of which, 26b, is introduced, through the aperture 23, into the inner volume 1b of the body 1. Blades 28 are fixed to said end 26b.

The advantages to be had by adopting any one of the arrangements according to the invention, which have just been described, will now be shown.

Firstly, a considerable reduction, known per se, of the total length of the drive device is obtained. As may be seen in all the Figures, and, for example in FIG. 1, the extension piece 10 is almost completely contained in the traversing cavity 16 which has been arranged coaxially with respect to the gear ring 8. By way of information, it will be indicated that for the grinding apparatus and furnaces employed in cement-works, the distance separating the end of the drive device farthest away from the flange 14 fixed to the body 1, from said flange 14, is reduced by several metres. In practice, the total length has been reduced by a value approximately equal to the length of a gear train 5 disposed in its casing.

This interest in reduction of the total length of the drive device may be conciliated, according to the embodiment of FIG. 2, with a reduction in the weight of the assembly. To this end, it is sufficient to make the cavity 10a at the centre of the extension piece 10.

However, the cavity 10a which, in the device of FIG. 2, is a cavity for lightening purposes, may in addition be advantageously used for ensuring the passage of various elements, as shown in FIGS. 3, 4 and 5.

In FIG. 3, the cavity 22a of the shaft 22 is used as conduit, particularly outlet conduit, of the materials contained in the inner volume 1b of the body 1. This is particularly interesting for the grinding apparatus and furnaces employed in cement-works, for example, and includes the further advantage of insulating, from both heat and corrosive atmospheres, the mechanical members, such as grooves 11, 12, 13 or sealing joints, or the actual gears.

Finally, it may be that there is no need to extract materials from the body 1 through aperture 23, but it has proved judicious either to make measurements in the volume 1b, as shown in FIG. 4, or to carry out a given work, mixing in the example shown in FIG. 5, in the volume 1b, this being rendered possible by adopting the arrangements of FIG. 5.

I claim:

1. Device for rotating a body, constituted by at least one speed reducing unit, the driven member of which is disposed substantially coaxially with the axis of rotation of the body, whilst said driven member is coupled, by an extension piece, whose axis may have a slight angular clearance for making up the possible misalignment of the driven member and the axis of rotation of the body, to a flange for rotating the body integral with said body, the driven member of the unit being disposed on the side opposite the body with respect to said unit and said driven member comprising a central traversing cavity, through which the extension extends, wherein the body being hollow and having an aperture substantially coaxial to its drive flange and the extension piece having, in manner known per se, a coaxial cavity, a first hollow shaft traverses the extension piece, is rendered integral with the body and is connected in sealed manner to the opening of said body.

2. Drive device as claimed in claim 1, wherein a second shaft penetrates inside the body, through the first hollow shaft and, passing through the opening of said body, supports a measuring equipment by its part contained in said body.

3. Device as claimed in claim 1, wherein a second shaft penetrates inside the body, through the first hollow shaft and, passing through the opening of said body, supports a tool by its part contained in said body, whilst it is coupled by its end located on the unit side where the driven member of this unit is disposed, to a drive motor unit.

* * * * *